United States Patent [19]
Hliboki et al.

[11] Patent Number: 4,536,085
[45] Date of Patent: Aug. 20, 1985

[54] MULTIPLE VACUUM FRAME UNIT

[75] Inventors: Joseph G. Hliboki, Old Tappan; Paul Staudenmaier, Flanders, both of N.J.

[73] Assignee: Teaneck Graphics Corp., Carlstadt, N.J.

[21] Appl. No.: 574,489

[22] Filed: Jan. 27, 1984

[51] Int. Cl.³ .............................................. G03B 27/20
[52] U.S. Cl. .......................................... 355/93; 355/94
[58] Field of Search ...................... 355/85, 87, 93, 94; 312/200

[56] References Cited

U.S. PATENT DOCUMENTS

| | | | |
|---|---|---|---|
| 1,742,372 | 1/1930 | Taylor | 355/94 |
| 2,594,920 | 4/1952 | Halpern | 355/93 |
| 3,771,869 | 11/1973 | Diehl et al. | 355/85 |
| 3,973,847 | 8/1976 | Gygax et al. | 355/85 |

Primary Examiner—Richard A. Wintercorn
Attorney, Agent, or Firm—David A. Jackson; Daniel H. Bobis

[57] ABSTRACT

A vacuum frame includes a base section having a recessed area within which are positioned a plurality of simultaneous instant start lights; a glass frame pivotally connected at the upper end of the base section by hinges so as to be pivotally movable between a closed position and a desired opened position; a blanket frame pivotally connected by hinges to the glass frame so as to be pivotally movable with respect to the base section and the glass frame between a closed position and a desired opened position; first and second piston-cylinder assemblies pivotally connected at opposite sides of the vacuum frame between the blanket frame and the base section for maintaining the blanket frame in a desired opened position; third and fourth piston-cylinder assemblies pivotally connected at opposite sides of the vacuum frame between the glass frame and the base section for maintaining the glass frame in a desired opened position independent of the pivoted position of the blanket frame; a first locking assembly for locking the glass frame in its closed position; a second locking assembly for locking the blanket frame in its closed position; a vacuum pump for creating a vacuum between the glass frame and blanket frame; and a control and switching device for controlling the vacuum pump and energization of the lights so as to develop a sensitized material in an exact copy of a film negative when the sensitized material and film negative are positioned in alignment between the glass frame and blanket frame.

14 Claims, 8 Drawing Figures

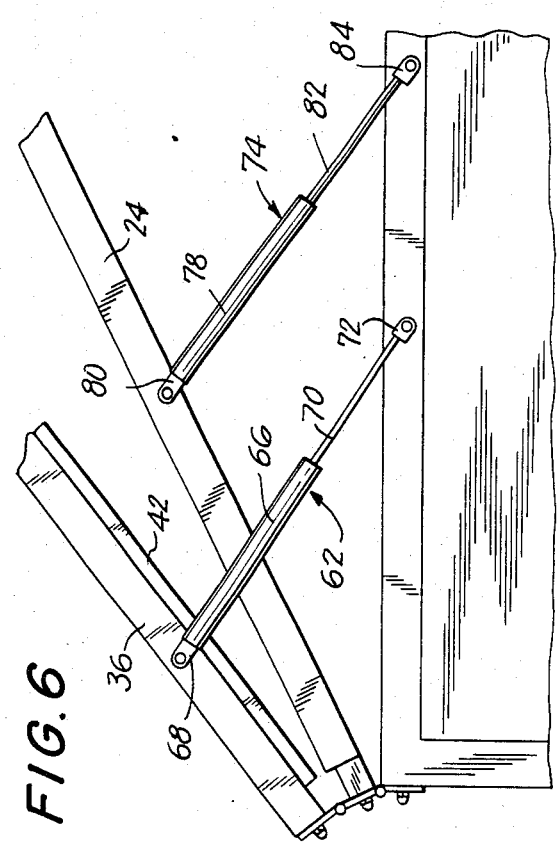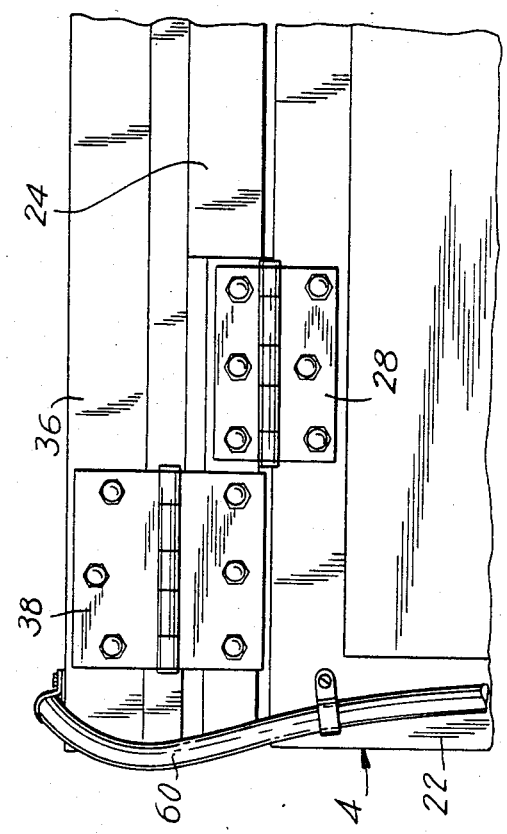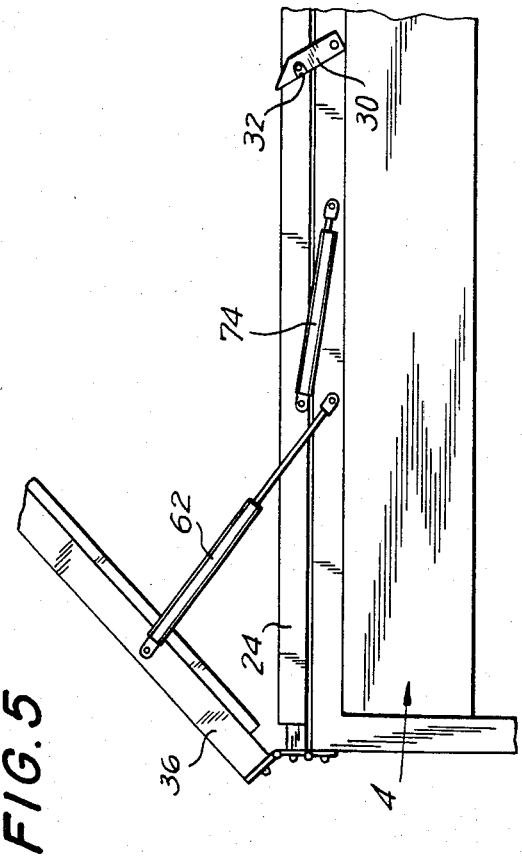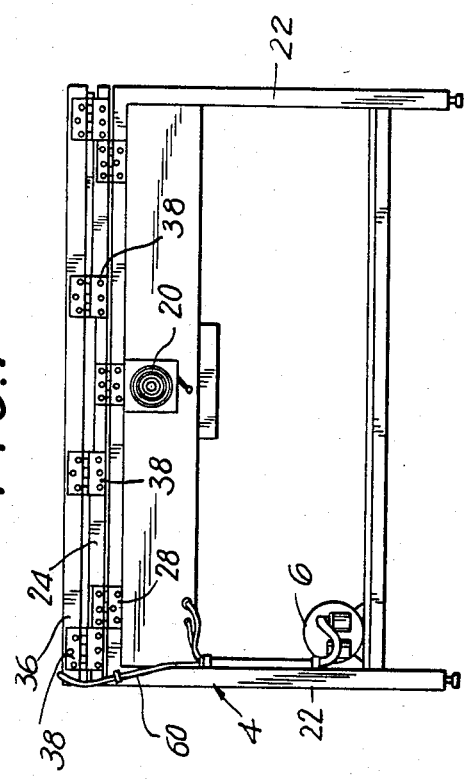

MULTIPLE VACUUM FRAME UNIT

BACKGROUND OF THE INVENTION

1. Field of the Invention

This invention relates generally to vacuum frames and, more particularly, is directed to a vacuum printing frame for reproduction purposes.

2. Description of the Prior Art

It is well known in the art to provide a vacuum frame for reproducing an original document or work of art utilizining a sensitized material.

In one known type of vacuum frame designed to expose and clear Dupont "Dylux" material, the apparatus includes a main frame having a recessed area within which are positioned a plurality of simultaneous instant start black light bulbs used for exposing the "Dylux" material. A glass frame is positioned above the bulbs and is secured to the top of the frame, and a blanket frame is hingedly secured to the main frame above the glass frame. Generally, the "Dylux" material and a film negative are positioned on the glass, and the blanket frame is then secured over the glass frame. A vacuum is then applied to the space between the blanket frame and glass frame so as to flatten the sensitized material and the film negative, and the black light bulbs are then simultaneously instantly started so as to develop the sensitized material in an exact copy of the film negative.

However, with such conventional vacuum frames, in order to change the black light bulbs positioned beneath the glass or to clean the bottom of the glass, either the glass must be removed, or alternatively, an access door is provided in the main frame to provide access to such area. This, of course, is troublesome, time-consuming and costly.

A photographic printing apparatus is also known from U.S. Pat. No. 1,742,372 to Taylor in which a plurality of incandescent lamps are located within a chamber in a cabinet of the apparatus, and two frames are pivotally connected to the apparatus above the lamps. In particular, one element or frame is hinged directly to the apparatus above the incandescent lamps and includes two parallel, spaced sheets of glass. A second frame or element which carries a sheet of rubber is pivotally connected to the first frame which carries the parallel, spaced sheets of glass. With this apparatus, sensitized objects to be printed on from negatives are placed on the top glass sheet and the upper frame is secured over the first frame, and a vacuum is created between the two frames such that the rubber sheet is drawn closely into contact with the negative and sensitized object. The patent discloses that the glass frame is hinged to the apparatus to enable ready access in case of necssity to the electric incandescent lamps positioned thereunder. There is no disclosure of maintaining the two frames open at different desired positions independent of each other.

U.S. Pat. No. 3,973,847 to Gygax et al. discloses the production of graphic patterns in which UV bulbs are positioned in a recessed portion of a housing, and a first frame carrying a transparent glass plate is pivotally connected to the housing by a hinge and a second frame carrying a rubber pressure mat is also pivotally connected to the housing above the glass frame and pivotally connected about the same hinge. A film negative and a metallic substrate, for example, are inserted between the glass plate and the rubber pressure mat above the UV bulbs to be exposed in the conventional manner. However, as with the Taylor Patent, there is no disclosure of any means for maintaining the lid and glass frame at desired pivoted positions independently of each other.

A "Dylux" proofer sold by The Douthitt Corporation of Detroit, Mich. is known similar to the types described in the above U.S. patents. In particular, the glass and blanket frames can be secured together and then raised together to clear the underside of the glass or for installing bulbs. A lock mechanism is provided for locking the frames at a single predetermined opened position. However, this unit suffers from the same deficiencies of the above U.S. patents.

Further, because of othe great combined weight of the glass and blanket frames, it is disadvantageous to lift the two frames together. In the first place, this is difficult to accomplish, and secondly, it is difficult to maintain the combined frames in an opened position.

Other patents which may be of interest are U.S. Pat. No. 2,594,920 to Halpern and U.S. Pat. No. 3,771,869 to Deihl et al.

It has also been known by the applicant to utilize a piston-cylinder arrangement in a vacuum frame setting, in which the glass frame is not pivotally secured to the apparatus, to maintain the lid containing the rubber mat at a desired pivoted position.

OBJECTS AND SUMMARY OF THE INVENTION

Accordingly, it is an object of the present invention to provide a novel vacuum frame that provides for ready access to the area beneath the glass frame for cleaning the bottom of the glass or changing the bulbs in the main frame.

It is another object of the present invention to provide a vacuum frame in which the glass frame is hingedly moveable with respect to the main frame, independent of the hinged movement of the blanket frame.

It is yet another object of the present invention to provide a vacuum frame for independently maintaining the glass frame and blanket frame at desired pivoted positions with respect to the main frame.

In accordance with an aspect of the present invention, a vacuum frame includes a main frame; light means positioned within said main frame; a glass frame hingedly secured with respect to the main frame above said light means; a blanket frame hingedly secured with respect to said main frame and said glass frame and positioned above said glass frame; vacuum means for creating a vacuum in the space defined between said blanket frame and said glass frame when both are in their closed positions; first means for maintaining said glass frame at a desired pivoted position with respect to said main frame; and second means for maintaining said blanket frame at a desired pivoted position with respect to said main frame independent of said first means and independent of said desired pivoted position of said glass frame.

The above, and other, objects, features and advantages of the present invention will become readily apparent from the following detailed description thereof which is to be read in connection with the accompanying drawings.

BRIEF DESCRIPTION OF THE DRAWINGS

FIG. 5 is a side plan view of a portion of the vacuum frame of FIG. 2;

FIG. 6 is a side plan view of a portion of the vacuum frame of FIG. 3;

FIG. 7 is a rear perspective view of the vacuum frame of FIG. 1; and

FIG. 8 is a rear plan view of a portion of the vacuum frame of FIG. 1.

DETAILED DESCRIPTION OF A PREFERRED EMBODIMENT

Figure 1:
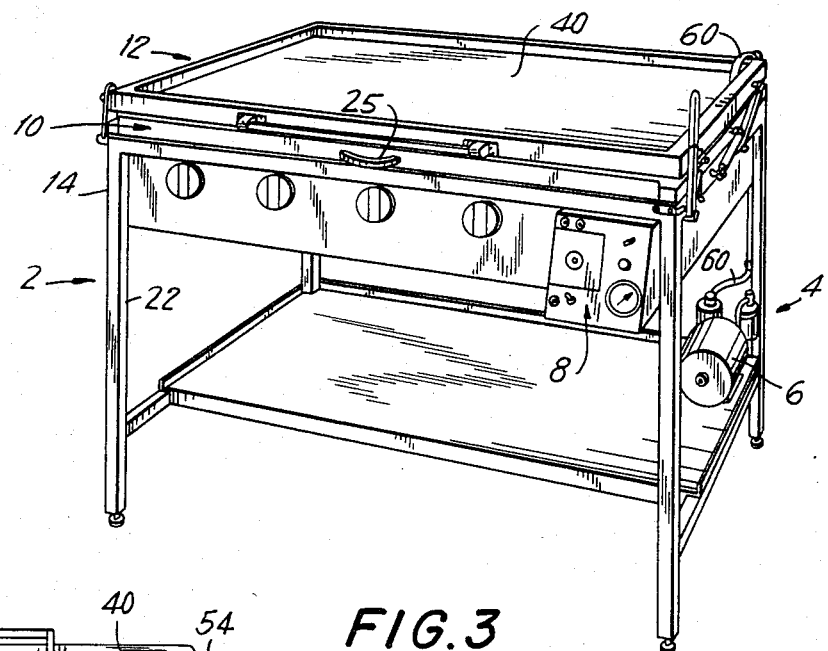
FIG. 1 is a front perspective view of a vacuum frame according to one embodiment of the present invention, illustrating the glass frame and blanket frame in closed positions.

Referring to the drawings in detail, and initially to FIG. 1 thereof, a vacuum frame 2 according to the present invention generally includes a base section 4, a vacuum pump 6, control and switching means 8 for controlling and switching vacuum pump 6 and other electrical parts of the apparatus, a glass frame 10 pivotally connected at the top of base section 4 and a blanket frame 12 also pivotally secured to the top of base section 4 above glass frame 10.

Figure 2:
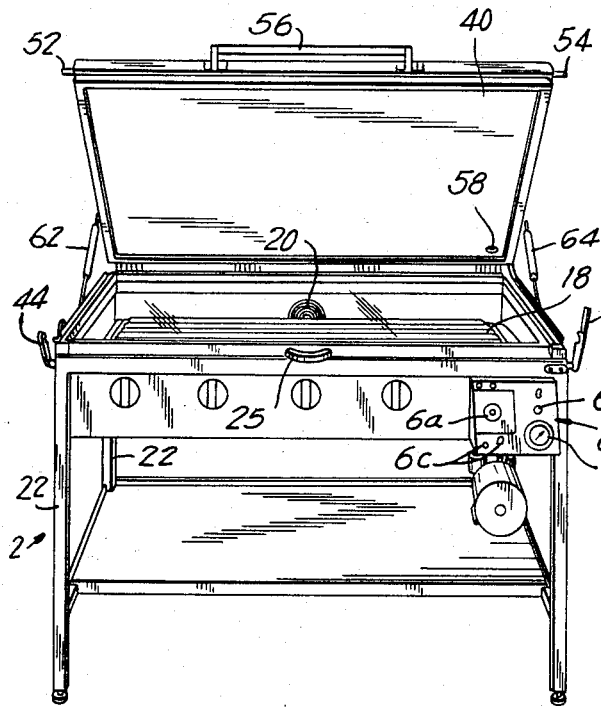
FIG. 2 is a front perspective view of the vacuum frame of FIG. 1, illustrating the blanket frame in a pivoted position.
Figure 3:
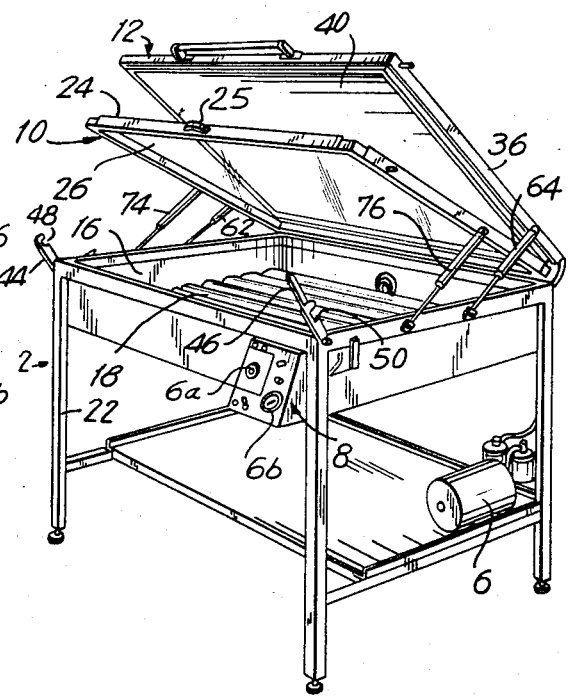
FIG. 3 is a perspective view of the vacuum frame of FIG. 1, illustrating the glass frame and blanket frame each independently pivoted to a desired pivoted position.

More particularly, base section 4 includes a housing 14 of a substantially rectangular box-like configuration which is open at the upper end thereof and thereby forms a recessed section 16 within which are disposed a plurality of high output simultaneous instant start black light bulbs 18 for exposing a sensitized material, as will be discussed hereinafter. The energization of the bulbs 18 is controlled by the control and switching means 8 in a manner well known in the art which will not be described in further detail. In addition, a fan 20 at the rear portion of the housing, as shown in FIGS. 2, 3 and 7, is provided and operates in cooperation with energization of black light bulbs 18 to cool the latter and the glass during operation thereof. Housing 14 is supported at respective corners thereof by support legs 22.

As previously discussed in general, glass frame 10 is pivotally secured to base section 4. More particularly, glass frame 10 generally comprises a rectangular frame 24, preferably of a metal material, and a transparent glass plate 26 mounted within rectangular frame 24. Rectangular frame 24 is pivotally secured along one edge of housing 14 by means of hinges 28, as shown in FIGS. 7 and 8, and can be pivotally raised by a handle 25 at the front end thereof. Frame 24 is generally of the same dimensions as the frame at the upper end of base section 4. In this manner, when glass frame 10 is in a closed position, as shown in FIGURES 1, 4 and 5, glass frame 10 rests upon the upper frame of base section 4.

Figure 4:
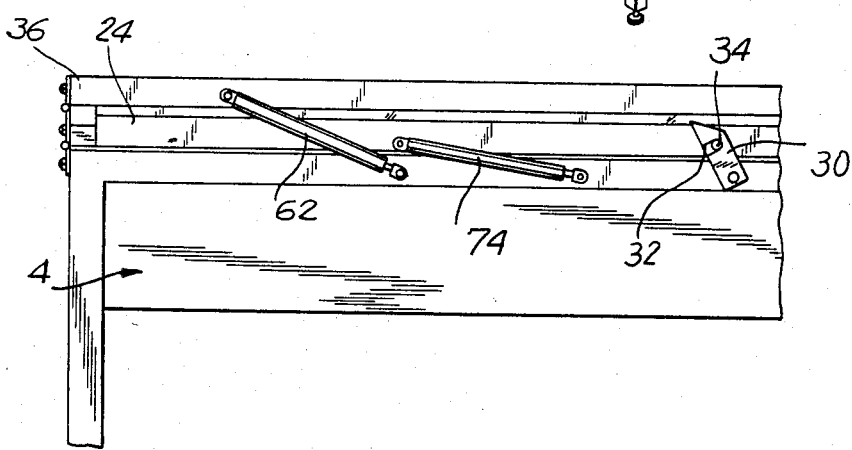
FIG. 4 is a side plan view of a portion of the vacuum frame of FIG. 1.

For locking glass frame 10 on base section 4, a locking lever 30 is pivotally secured on opposite sides of base section 4, as shown in FIG. 4. Locking lever 30 includes a groove or notched section 32 at its free end which is adapted to be pivoted into locking engagement with a respective post 34 extending from opposite sides of frame 24. With this arrangement, glass frame 10 can be pivotally raised with respect to base section 4, for example, for changing bulbs and for cleaning the underside of the glass plate 26, as shown in FIGS. 3 and 6, or alternately, can be locked in a closed position on base section 4, as shown in FIGURES 1, 4 and 5.

Blanket frame 12 is formed in like manner of a rectangular frame 36 made from a metal material, and is also pivotally secured with respect to base section 4. More particularly, frame 36 is of the same general dimensions as frame 24 and is pivotally connected to frame 24 by means of a plurality of hinges 38, as shown in FIGS. 7 and 8. In this manner, frame 36 not only is pivotally connected with respect to base section 4, but is also pivotally connected with respect to frame 24. Disposed within the inner periphery of frame 36 and parallel thereto, is a blanket 40, for example, a heavy duty nylon and synthetic sponge blanket. Blanket 40 is attached to frame 36 by any suitable means, for example, blanket 40 can be inserted within an inner peripheral slot of frame 36, of the type disclosed in U.S. Pat. No. 4,240,743, having a common assignee herewith and the disclosure of the entire patent being incorporated herein by reference. Since frame 36 is of the same dimensions as frame 24, when blanket frame 12 is in its closed position, as shown in FIGS. 1 and 4, frame 36 sits on and abuts frame 24.

In order to provide an air-tight vacuum seal between glass frame 10 and blanket frame 12, the underside of frame 36 is provided with a gasket 42, preferably of a rubber, resilient material. In this regard, when frame 36 is in its closed position, as shown in FIGS. 1 and 4, an air-tight vacuum chamber is provided between glass plate 26 and blanket 40. Alternatively, it is to be appreciated that a similar gasket may be provided at the upper end of frame 24 in addition to, or in place of gasket 42.

In a similar manner to glass frame 10, blanket frame 12 can be locked in its closed position, thereby ensuring an air-tight vacuum seal with gasket 42. In this regard, a pivot bar (not shown) extends through the front of base section 4 and terminates at one end thereof with a pivoting arm 44 fixedly secured thereto and at the opposite end thereof with a pivoting handle 46 also secured to the pivoting bar. Accordingly, when pivoting handle 46 is pivoted to a locking position, pivoting arm 44 is also pivoted therewith. Pivoting arm 44 and pivoting handle 46 each include respective grooved or notched sections 48 and 50 which engage with respective locking pins 52 and 54 at opposite sides of frame 36 for locking blanket frame 12 in its closed position. As with glass frame 10, blanket frame 12 is also provided with a handle 56 at the front end thereof for pivoting blanket frame 12 between a pivoted opened and closed position. In addition, blanket frame 36 is provided with at least one aperture 58 which is connected to the vacuum pump 6 by means of a suitable vacuum line 60, as shown in FIGS. 1 and 7.

During operation, glass frame 10 is locked in its closed position by locking levers 30. A sensitized material and a film negative are placed in alignment on glass plate 26, and then blanket frame 12 is locked in its closed position by pivoting arm 44 and handle 46 into engagement with pins 52 and 54, respectively. Control and switching means 8 then control vacuum pump 6 to evacuate the area between glass plate 26 and blanket 40, in a conventional manner, and to energize bulbs 18 so as to develop the sensitized material, such as DuPont "Dylux", in an exact copy of the film negative. Also, fan 20 is activated. In this regard, it is to be appreciated that control and switching means 8 may include a timer 6a, a vacuum guage 6b and other operational switches 6c.

As previously discussed, both glass frame 10 and blanket frame 12 are pivotally hinged with respect to base section 4 and with respect to each other. In addition, in accordance with an aspect of the present invention, glass frame 10 and blanket frame 12 can be maintained at any desired pivoted position, independent of each other. More particularly, first and second piston-cylinder assemblies 62 and 64 are pivotally connected between frame 36 and base section 4 at opposite sides of the apparatus. As shown in the FIGURES, first piston-cylinder assembly 62 has its cylinder portion 66 pivotally connected at the free end 68 thereof to one side of frame 36 and its piston portion 70 pivotally connected at the free end 72 thereof to base section 4 at the same side thereof. Second piston-cylinder assembly 64 at the opposite side of the apparatus is connected between frame 36 and base section 4 in a symmetrical manner to the connection of first piston-cylinder assembly 62 as discussed above. A suitable fluid is utilized such that, when blanket frame 12 is pivoted to an open position, and then released, first and second piston-cylinder assemblies 62 and 64 will substantially maintain blanket frame at the desired opened position.

In like manner, separate third and fourth piston-cylinder assemblies 74 and 76 are connected between frame 24 and base section 4 at opposite sides of the apparatus. In this manner, the cylinder portion 78 of third piston-cylinder assembly 74 is pivotally connected at the free end 80 thereof to one side of frame 24, and the piston portion 82 is pivotally connected at the free end 84 thereof to the same side of base section 4. Fourth piston-cylinder assembly 76 is pivotally connected between frame 24 and base section 4 at the opposite side of the apparatus in a symmetrical manner to the connection of third piston-cylinder assembly 74. As with blanket frame 12, when glass frame 10 is pivoted to a desired opened position, third and fourth piston-cylinder assemblies 74 and 76 substantially maintain glass frame 10 in such opened position.

It is to be appreciated that glass frame 10 and blanket frame 12 can therefore be maintained at different desired opened positions, independent of the other. This provides ease in pivotally opening the two frames, since each frame is pivoted separately, and ease in maintaining the two frames at desired opened positions since relatively small, compact and inexpensive piston-cylinder assemblies need only be used. Thus, both sides of the glass can readily be cleaned and the bulbs can readily and easily be installed or changed.

Having described a specific preferred embodiment of the invention with reference to the accompanying drawings, it is to be understood that the present invention is not limited to that precise embodiment, and that various changes and modifications may be effected therein by one of ordinary skill in the art without departing from the spirit and scope of the present invention as defined by the appended claims.

What is claimed is:

1. A vacuum frame comprising:
    a base section;
    glass frame means pivotally connected with respect to said base section between a closed position and a desired opened position;
    blanket frame means pivotally connected with respect to said glass frame means and said base section between a closed position and a desired opened position;
    vacuum means for creating a vacuum between said blanket frame means and said glass frame means when both are in their closed positions;
    control means for controlling said vacuum means to create said vacuum;
    first means for maintaining said blanket frame means in a desired opened position with respect to said base section; and
    second means for maintaining said glass frame means in a desired opened position with respect to said base section independent of the desired opened position of said blanket frame means.

2. A vacuum frame according to claim 1; in which said first means and said second means each include at least one piston-cylinder means.

3. A vacuum frame according to claim 2; in which said first means includes first and second piston-cylinder assemblies pivotally connected between said blanket frame means and said base section at opposite sides of said vacuum frame, respectively.

4. A vacuum frame according to claim 2; in which said second means includes first and second piston-cylinder assemblies pivotally connected between said glass frame means and said base section at opposite sides of said vacuum frame, respectively.

5. A vacuum frame according to claim 1; in which said glass frame means is pivotally connected at one edge thereof to said base section and said blanket frame means is pivotally connected to said one edge of said glass frame means.

6. A vacuum frame according to claim 1; in which said glass frame means includes a substantially rectangular frame section and a transparent glass plate mounted within said substantially rectangular frame section.

7. A vacuum frame according to claim 6; in which said apparatus further includes locking means for locking said glass frame means in its closed position.

8. A vacuum frame according to claim 7; in which said locking means includes post means extending from said substantially rectangular frame section and lever means pivotally connected to said base section and including a notched section for engaging said post means to lock said glass frame means in its closed position.

9. A vacuum frame according to claim 1; in which said blanket frame means includes a substantially rectangular frame section and a rubber blanket mounted within said substantially rectangular frame section.

10. A vacuum frame according to claim 9; in which said apparatus further includes locking means for locking said blanket frame means in its closed position.

11. A vacuum frame according to claim 10; in which said locking means includes pin means extending from said substantially rectangular frame section of said blanket frame means, and handle means pivotally connected to said base section and including a notched section for engaging said pin means to lock said blanket frame means in its closed position.

12. A vacuum frame according to claim 1; in which said base section includes a recessed section, and said vacuum frame further includes light means positioned within said recessed section and controlled by said control means for energization.

13. A vacuum frame according to claim 12; further including fan means mounted in said base section for cooling said recessed section during energization of said light means.

14. A vacuum frame according to claim 1; in which at least one of said blanket frame means and glass frame means includes gasket means for providing an air-tight seal between said blanket frame means and glass frame means when both are in their closed positions.

* * * * *